No. 648,438. Patented May 1, 1900.
E. C. RINNER & P. P. DE HART.
SELF BASTING BAKING AND ROASTING PAN.
(Application filed Nov. 24, 1899.)
(No Model.)
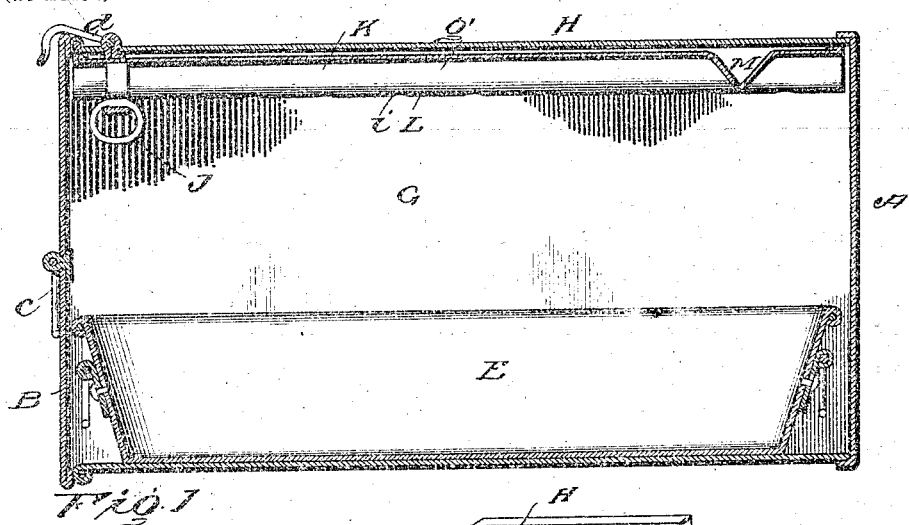
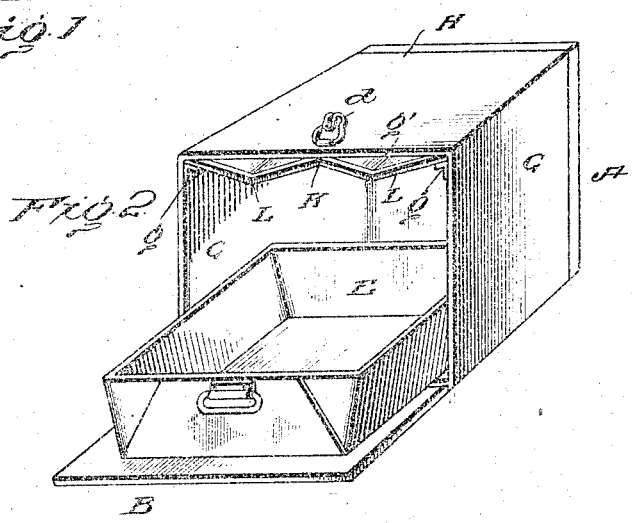
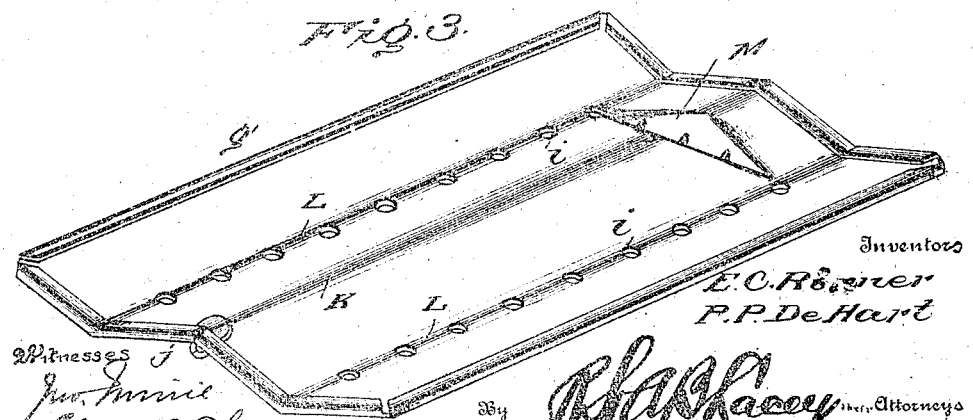
Inventors
E. C. Rinner
P. P. De Hart
Witnesses

UNITED STATES PATENT OFFICE.

ELIJAH C. RINNER AND PETER P. DE HART, OF COSHOCTON, OHIO.

SELF-BASTING BAKING OR ROASTING PAN.

SPECIFICATION forming part of Letters Patent No. 648,438, dated May 1, 1900.

Application filed November 24, 1899. Serial No. 738,222. (No model.)

*To all whom it may concern:*

Be it known that we, ELIJAH C. RINNER and PETER P. DE HART, citizens of the United States, residing at Coshocton, in the county of Coshocton and State of Ohio, have invented certain new and useful Improvements in Self-Basting Baking or Roasting Pans; and we do hereby declare the following to be a full, clear, and exact description of the invention, such as will enable others skilled in the art to which it appertains to make and use the same.

This invention belongs to the class of culinary appliances, and most especially to pans for roasting meats and the like requiring frequent basting to prevent drying and loss of flavor.

The purpose of the invention is to devise a basting attachment which will condense the steam and vapors and direct the liquid resulting from condensation back upon the article of food longitudinally and laterally and which will be stiffened transversely and linearly.

Other objects and advantages will appear in the course of the subjoined description, and in order that a full knowledge of the means for effecting the ends may be acquired reference is to be had to the following description and the drawings hereto attached, in which—

Figure 1 is a vertical central longitudinal section of a bake-pan, showing the application of the invention. Fig. 2 is a perspective view, the door being open and the pan partly withdrawn. Fig. 3 is a perspective view of the basting attachment.

Corresponding and like parts are referred to in the following description and indicated in all the views of the drawings by the same reference characters.

Referring now more particularly to the drawings, A represents the pan or vessel, which may be of any desired shape and size, but is preferably made rectangular and of oblong form, as shown. This pan or vessel is closed at bottom, top, sides, and one end and open at the opposite end. A door B is hinged or pivoted at its lower edge to the bottom and is adapted to close the said open end of the pan. A pivoted loop or ring c is provided upon the outer side of the door to enable the same to be conveniently pulled open, and this loop is adapted to fold snugly against the cover to allow the latter when let down to lie horizontally in the plane of the bottom of the pan. The cover is held closed by a catch or hook d, pivoted to the top of the pan and adapted to take over the outer edge of the cover and bear upon the outer side thereof, as shown. The article of food to be baked or roasted is placed in a shallow pan E or a grated broiler, which is of a size to snugly fit the outer vessel or pan A and rests upon the bottom thereof.

The basting attachment, drip-plate, or tray g' is slidably supported by longitudinal supports consisting of metallic strips g, secured to the inner surfaces of the sides G of the pan a short distance below the top H thereof, and forms with said top condensation-chambers in the upper portion of the pan to receive the steam rising from below. This basting attachment is preferably formed from a plate or oblong piece of metal bent medially, as at K, and having its side portions rebent, as at L, to form open-ended troughs, which are of V shape in cross-section and provided with a central row of perforations i for inlet of steam to and passage of water from said chambers. The side edges of the inclined sides of the plate are bent to lie in the same horizontal plane, so as to slide easily in the guideways formed by the strips g and top of the pan, and the edge of the plate is beaded all around for strengthening purposes. The intermediate portion K is of anticlinal form and the side portions L of synclinal form, the sides of the intermediate portion being common to and forming the inner sides of the synclinal portions. The rear end portion of the part K is formed with a transversely-disposed synclinal portion M, the terminals of which lead into the bottom portions of the parts L, whereby the condensed vapors may find their way to the parts L and to the end portion of the article being cooked. The synclinal portion M serves in a great measure to brace the basting attachment transversely at an intermediate point. The perforations i may be made of any approved shape or size and arranged in any desired manner, and the plate is provided at one end with a finger-receiving ring or loop j for convenience in sliding it out.

In operation the roast is placed in the pan E and the cover B tightly closed. The steam rising from the contents of the pan will flow through the perforations $i$ in the drip-plate or basting attachment into the upper condensation-chambers and circulate therein and condense on the inclined sides of the drip-plate. The moisture thus formed will run down said inclined sides of the depressed portions of the plate and drip through the perforations therein down upon the roast in the pan, thus effecting an automatic basting of the meat in a simple and effective manner.

After the roast has been sufficiently basted the cover may be let down to allow the greater part of the steam to escape to the atmosphere and permit the roast to brown. By letting down the cover the entire interior of the pan may be inspected without removing or disturbing the drip-plate or other parts. baking or roasting pan and its contents may also be partly withdrawn for inspection or to keep the same warm when the cooking operation has progressed far enough by simply sliding said pan out upon the cover, which will serve as a support therefor.

When it is desired to clean the pan and drip-plate, the latter is removed by sliding it out through the door-opening, whereupon all parts of the interior of the pan may be conveniently reached.

Having thus described the invention, what is claimed as new is—

A basting attachment for pans open at one end and having rigidly-connected bottom, top and sides, and having longitudinal supports near the top of its sides, said attachment being slidable on the longitudinal supports through the open end of the pan and consisting of a sheet-metal plate having its end and side edges bent, and having a middle anticlinal portion and side synclinal portions, and having an end synclinal portion transversely of the anticlinal portion, the longitudinal and transverse synclinal portions having perforations in their bottoms, substantially as described.

In testimony whereof we affix our signatures in presence of two witnesses.

ELIJAH C. RINNER. [L. S.]
PETER P. DE HART. [L. S.]

Witnesses:
B. F. VOORHEES,
SAADI MAUSON.